(12) United States Patent
El-Beshbeeshy et al.

(10) Patent No.: US 9,638,128 B2
(45) Date of Patent: May 2, 2017

(54) STRATEGY FOR FUELING A DIESEL ENGINE

(75) Inventors: Mahmoud S. El-Beshbeeshy, Mount Prospect, IL (US); Grzegorz Siuchta, Des Plaines, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 487 days.

(21) Appl. No.: 14/114,589

(22) PCT Filed: Apr. 29, 2011

(86) PCT No.: PCT/US2011/034495
§ 371 (c)(1),
(2), (4) Date: Oct. 29, 2013

(87) PCT Pub. No.: WO2012/148413
PCT Pub. Date: Nov. 1, 2012

(65) Prior Publication Data
US 2014/0069392 A1 Mar. 13, 2014

(51) Int. Cl.
*F02D 41/30* (2006.01)
*F02D 41/40* (2006.01)

(52) U.S. Cl.
CPC ............ *F02D 41/30* (2013.01); *F02D 41/401* (2013.01); *F02D 2200/0618* (2013.01); *F02D 2250/31* (2013.01); *Y02T 10/44* (2013.01)

(58) Field of Classification Search
CPC ...... F02D 41/401; F02D 41/40; F02D 41/402; F02D 41/403; F02D 41/405; F02D 2200/0618; F02D 2250/31; F02M 21/0215; F02M 37/0064; F02M 37/0088; F02M 43/00

See application file for complete search history.

(56) References Cited

U.S. PATENT DOCUMENTS

| 4,807,811 | A | * | 2/1989 | Aketa | .................... F02M 47/02 |
| | | | | | 123/447 |
| 5,743,237 | A | * | 4/1998 | Matta | .................... F02M 45/08 |
| | | | | | 123/496 |
| 6,491,016 | B1 | * | 12/2002 | Buratti | ................ F02D 41/3827 |
| | | | | | 123/299 |
| 6,850,832 | B1 | | 2/2005 | Rodriguez | |
| 6,948,476 | B2 | * | 9/2005 | Gioannini | ............. F02D 41/029 |
| | | | | | 123/299 |

(Continued)

*Primary Examiner* — Hung Q Nguyen
*Assistant Examiner* — Brian P Monahon
(74) *Attorney, Agent, or Firm* — Jack D. Nimz; Jeffrey P. Calfa

(57) ABSTRACT

A compression ignition engine (10) operates to fuel an engine cylinder (12) to create an in-cylinder air-fuel charge and to cause that charge to autoignite. A fuel injector (20) operates to inject fuel into the engine cylinder for substantially the entire duration of a first phase (24) of fuel injection at substantially the maximum injection pressure that the fuel injector can deliver to create a premixed fraction of the in-cylinder air-fuel charge prior to autoignition. As the first phase ends, fuel injection transitions to a second phase (26) which commences in advance of autoignition. During the second phase, the fuel injector injects fuel into the engine cylinder at a rate of injection that is significantly less than the rate of injection used during the first phase.

6 Claims, 1 Drawing Sheet

(56) References Cited

U.S. PATENT DOCUMENTS

| | | | |
|---|---|---|---|
| 7,200,485 B2 | 4/2007 | Kennedy | |
| 2002/0007816 A1* | 1/2002 | Zur Loye | F02B 1/12 123/295 |
| 2002/0185112 A1* | 12/2002 | Lei | F02M 45/04 123/446 |
| 2003/0168039 A1* | 9/2003 | Ebelsheiser | F02B 3/10 123/299 |
| 2004/0055282 A1* | 3/2004 | Gray, Jr. | F01N 3/035 60/278 |
| 2004/0194756 A1* | 10/2004 | Hotta | F02D 41/3836 123/299 |
| 2005/0161020 A1* | 7/2005 | Tomita | F02D 37/02 123/305 |
| 2005/0205052 A1* | 9/2005 | Blessing | F02D 41/403 123/299 |
| 2006/0037563 A1* | 2/2006 | Raab | F02B 47/02 123/25 C |
| 2006/0150931 A1* | 7/2006 | Sturman | F02B 33/22 123/64 |
| 2006/0243242 A1* | 11/2006 | Blessing | F02B 1/12 123/299 |
| 2008/0135014 A1* | 6/2008 | Blessing | F02D 41/405 123/299 |
| 2011/0288744 A1* | 11/2011 | Gokhale | F02D 35/02 701/102 |

* cited by examiner

STRATEGY FOR FUELING A DIESEL ENGINE

FIELD OF THE DISCLOSURE

This disclosure relates to a strategy for fueling a compression ignition (diesel) internal combustion engine. More specifically it relates to a strategy for more completely combusting fuel in an engine cylinder so that smaller quantities of soot and NOx are present in exhaust leaving the engine cylinder.

BACKGROUND

Premixed Charge Compression Ignition (PCCI) is a known process for fueling a diesel engine in a manner that creates an air-fuel charge inside an engine cylinder during a compression upstroke of a piston during an engine cycle. After a desired quantity of fuel for the charge has been injected into the cylinder, the increasing compression of the charge by the upstroking piston creates sufficiently large pressure to cause auto-ignition of the charge as the piston is coming to top dead center (TDC). Auto-ignition may occur as the substantially simultaneous spontaneous combustion of vaporized fuel at various locations within the mixture.

While PCCI is known to provide certain advantages for limiting the creation of certain constituents in products of in-cylinder combustion that affect tailpipe emissions, PCCI is limited to use at relatively lighter engine loads and relatively lower engine speeds. For relatively heavier engine loads and relatively higher engine speeds, conventional diesel (CD) combustion is used. The nature of CD combustion inherently generates soot that remains in the products of combustion exhausted from the engine cylinders. In order to reduce the amount of soot in tailpipe emissions, some engine exhaust systems include diesel particulate filters for trapping soot. The trapped soot is burned off either naturally as the engine operates (natural regeneration) or by increasing exhaust temperature through the burning of extra fuel (forced regeneration). The burning of extra fuel reduces fuel economy of a vehicle that is being driven by such as engine.

Processor-controlled fuel injection systems having high-pressure fuel injectors, such as HEUI injectors, are capable of controlling fuel injection with precision that allows fuel to be injected at various injection pressures, at various times, and for various different durations during an engine cycle. Certain fuel injectors have been shown capable of developing injection pressures as high as 3,300 to 3,600 bar. It is anticipated that even higher maximum pressures will be achieved as further development continues.

SUMMARY OF THE DISCLOSURE

The present disclosure relates to an engine having a fueling strategy that utilizes high-pressure injection capabilities of certain fuel injectors. When such a fuel injector fuels an engine cylinder, its rate of injection (ROI) is controlled in a manner that provides what may be considered as two injection phases. A first injection phase comprises injecting fuel into an engine cylinder substantially at a maximum ROI by injecting fuel substantially at maximum injection pressure that the fuel injector can deliver. During this time, the fuel being injected mixes with air that has been and/or is still being compressed by the piston to create a premixed fraction of an air/fuel charge that becomes increasingly homogenous, but that does not combust. Before combustion occurs in the cylinder, a second injection phase begins as the first injection phase is ending. The first injection phase duration may also sometimes be referred to as an Ignition Delay Period (IDP). The second injection phase comprises controlling ROI by controlling injection pressure to pressure which is significantly less than first phase injection pressure. The fuel being injected during the second phase creates charge stratification in the cylinder which triggers autoignition, sometimes also referred to as Start Of Combustion (SOC).

The point in an engine cycle at which autoignition occurs is translated into data from Apparent Heat Release Rate (AHRR) which is derived from measured cylinder pressure traces through the First Law of Thermodynamics analysis. That data is utilized by a control algorithm in an engine controller to control at least one characteristic of the first injection phase and/or the second injection phase in some way.

By injecting fuel substantially at maximum ROI during the first phase and then decreasing ROI to a significantly lower value during the second phase, a larger proportion of the total quantity of fuel injected during both phases can be injected during the first phase and a smaller proportion during the second phase. In this way a more homogenous mixture is created in an engine cylinder before any combustion occurs, enabling fuel to combust with less soot and less NOx generation.

For any given engine cycle, the point, i.e. the crank angle, at which autoignition occurs is ascertained by using information from an appropriate combustion sensor. Data representing that crank angle is used for feed-back control of at least one characteristic of the first injection phase and/or the second injection phase. If it is some characteristic of the second phase that is being controlled, and if the response time of the sensor and the processing time of the control algorithm are sufficiently fast to provide sufficiently accurate data for that engine cycle, that data can be used. However, if the response time of the sensor and the processing time of the control algorithm are not sufficiently fast, the data obtained during the immediately preceding engine cycle can be used. If it is a characteristic of the first phase of fuel injection that is being controlled, then the data obtained during the immediately preceding engine cycle is used.

The total quantity of fuel injected during the first and the second phases is determined by engine speed and engine load. Those factors are used to determine the timing of commencement of the first and second phases and the relative proportions of fuel injected during each phase. The commencement and the duration of the first phase are controlled with the objective of introducing as large a proportion of the fuel during the first phase to promote mixing while assuring that autoignition will not occur until some time during the second phase. Hence, fuel injection will transition from the first phase to the second phase in advance of autoignition by a finite amount of time which may vary depending on how the engine is being operated.

One aspect of the present disclosure relates to a method of operating a compression ignition engine by fueling an engine cylinder to create an in-cylinder air-fuel charge and causing that charge to autoignite. The method comprises operating a fuel injector to inject fuel into the engine cylinder for substantially the entire duration of a first phase of fuel injection at substantially the maximum injection pressure that the fuel injector can deliver to create a premixed fraction of the in-cylinder air-fuel charge prior to autoignition, and as the first phase of fuel injection ends, transitioning fuel injection to a second phase of fuel injection which commences in advance of autoignition and which comprises operating the fuel injector to inject fuel into the engine cylinder at injection pressure significantly less than the maximum injection pressure that the fuel injector can deliver.

Another aspect of the present disclosure relates to a compression ignition engine comprising: an engine cylinder; a fuel injector for fueling the engine cylinder to create an in-cylinder air-fuel charge that combusts by autoignition; an engine controller for processing an algorithm to control injection of fuel into the engine cylinder by the fuel injector, the algorithm being effective to cause the fuel injector to inject fuel into the engine cylinder for substantially the entire duration of a first phase of fuel injection at substantially the maximum injection pressure that the fuel injector can deliver to create a premixed fraction of the in-cylinder air-fuel charge prior to autoignition, the algorithm being further effective as the first phase of fuel injection ends to transition fuel injection to a second phase of fuel injection which commences in advance of autoignition and which comprises operating the fuel injector to inject fuel into the engine cylinder at injection pressure significantly less than the maximum injection pressure that the fuel injector can deliver.

Another aspect of the present disclosure relates to a method of operating a compression ignition engine by fueling an engine cylinder to create an in-cylinder air-fuel charge and to cause that charge to autoignite. The method comprises: operating a fuel injector to inject fuel into the engine cylinder at injection pressure of at least of 3,000 bar for substantially the entire duration of a first phase of fuel injection that commences within a window that extends from substantially 30° before TDC (top dead center) to substantially 10° deg after TDC to create a premixed fraction of the in-cylinder air-fuel charge prior to autoignition; and as the first phase of fuel injection ends, transitioning fuel injection to a second phase of fuel injection which commences in advance of autoignition and which comprises operating the fuel injector to inject fuel into the engine cylinder at injection pressure significantly less than the first phase injection pressure.

Another aspect of the present disclosure relates to a compression ignition engine comprising: an engine cylinder; a fuel injector for fueling the engine cylinder to create an in-cylinder air-fuel charge that combusts by autoignition; and an engine controller for processing an algorithm to control injection of fuel into the engine cylinder by the fuel injector, the algorithm being effective to cause the fuel injector to inject fuel into the engine cylinder at injection pressure of at least 3,000 bar for substantially the entire duration of a first phase of fuel injection that commences within a window that extends from substantially 30° before TDC to substantially 10° deg after TDC to create a premixed fraction of the in-cylinder air-fuel charge prior to autoignition; the algorithm being further effective as the first phase of fuel injection ends to transition fuel injection to a second phase of fuel injection which commences in advance of autoignition and which comprises operating the fuel injector to inject fuel into the engine cylinder at injection pressure significantly less than the first phase injection pressure.

The foregoing summary, accompanied by further detail of the disclosure, will be presented in the Detailed Description below with reference to the following drawings that are part of this disclosure.

DETAILED DESCRIPTION

Figure 1:
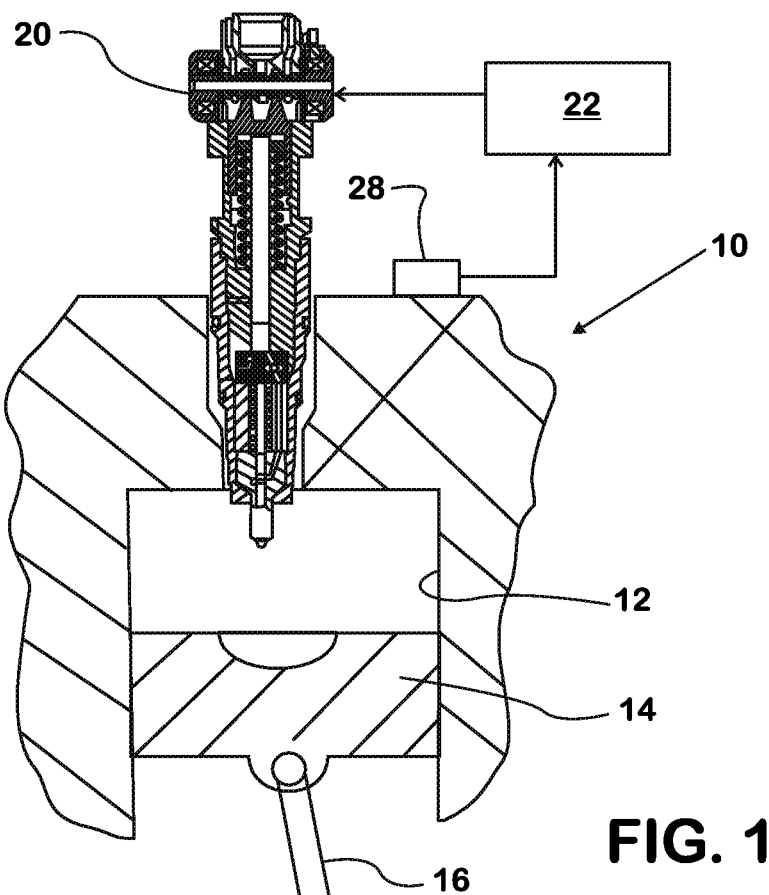
FIG. 1 is a schematic diagram of an engine cylinder having a representative fuel injector.

FIG. 1 shows a portion of a diesel engine 10 comprising an engine cylinder 12 within which an engine piston 14 coupled by a piston rod 16 to a crankshaft 18 reciprocates. A fuel injector 20 injects diesel fuel directly into engine cylinder 12 where the fuel combusts in air that has been compressed by engine piston 14 to create pressure that forces the piston to downstroke and impart torque to crankshaft 18 through piston rod 16.

Fuel injector 20 is representative of ones that are capable of injecting fuel at maximum injection pressures of at least 3,000 bar. At maximum injection pressure, fuel injector 20 delivers maximum ROI. Fuel injector 20 is also capable of injecting fuel at significantly lower pressures that result in smaller ROI. Operation of fuel injector 20 is controlled by a processor-based engine controller 22 that has a control algorithm which processes various data according to a control strategy to control timing and duration of fuel injections by fuel injector 20 and injection pressure.

Figure 2:
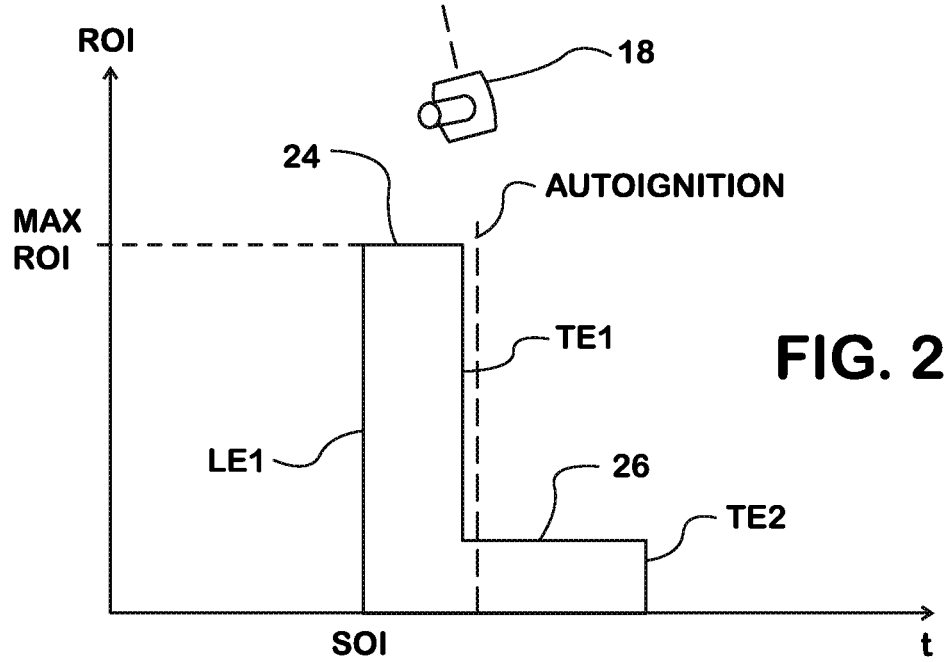
FIG. 2 is a timing diagram showing fuel injection by the fuel injector during a portion of an engine cycle.

FIG. 2 shows a fueling control strategy that comprises two phases, a first phase 24 of fuel injection, and a second phase 26 of fuel injection. The horizontal axis of FIG. 2 represents a portion of the engine cycle measured in either time or engine crank angle for engine cylinder 12. The vertical axis of FIG. 2 represents rate at which fuel is being injected into engine cylinder 12 (ROI) by fuel injector 20.

During first phase 24, fuel injector 20 is operated to inject fuel into engine cylinder 12 at a pressure of at least 3,000 bar. When data representing the point of autoignition (i.e., SOC) is used as a feed-back factor in that portion of the control strategy that controls the crank angle at which first phase 24 begins, the SOC data which is used is the SOC data obtained during the immediately preceding engine cycle. The SOC data is calculated via software that analyzes an in-cylinder pressure trace measured by an appropriate sensor 28 shown in FIG. 1. This software is based on the analysis of the First Law of Thermodynamics. The examples of different types of SOC sensors are "knock" and "ionization" sensors.

The entire first phase injection (except at the very beginning and the very end) occurs at a substantially maximum ROI at substantially the maximum injection pressure (MIP) that fuel injector 20 can deliver. First phase 24 is shown rectangular in shape but that shape may depart slightly from rectangular due to inclined leading and trailing edges LE1 and TE1 that reflect the response times of fuel injector 20 at the beginning and the end of first phase 24. The area encompassed by first phase 24 in FIG. 2 represents the quantity of fuel injected during first phase 24.

During second phase 26, fuel injector 20 injects fuel into engine cylinder 12 at pressure significantly lower than the first phase pressure, and hence at significantly lower ROI. Second phase 26 is shown rectangular in shape (representing substantially constant ROI) but that shape may depart from rectangular due to trailing edge TE2 which reflects the response time of fuel injector 20 at the end of second phase 26. Furthermore, ROI may vary during second phase 26 rather than being substantially constant. The area encompassed by second phase 26 in FIG. 2 represents the quantity of fuel injected during second phase 26.

During first phase 24, fuel being injected mixes with air that has been and/or is still being compressed by piston 14. The air may contain some re-circulated engine exhaust (EGR). The mixture becomes increasingly homogenous as the phase progresses, forming a premixed fraction of an air-fuel charge, but the mixture does not combust.

Prior to autoignition, first phase 24 ends, and as first phase 24 is ending, second phase 26 begins. The fuel injected during second phase 26 creates charge stratification in the cylinder which at some crank angle in the engine cycle after commencement of second phase 26 causes combustion to begin. That crank angle may be before or at the end of second phase fuel injection 26. FIG. 2 shows an example of second phase 26 beginning just slightly earlier than the point of autoignition and continuing for a portion of the engine cycle after autoignition.

The point of transition from first phase 24 to second phase 26 is controlled by the control strategy's use of data for various engine operating parameters toward the objective of obtaining a combustion event that meets desired engine performance, fuel consumption, and emission targets.

By injecting fuel during first phase 24 at substantially the maximum ROI of which fuel injector 20 is capable and then decreasing ROI to a significantly lower value during second phase 26, a larger proportion of the total quantity of fuel injected during both phases 24, 26 can be injected during first phase 24 and a smaller quantity during second phase 26. The first phase creates a premixed charge containing a relatively large quantity of fuel mixed with air throughout the charge volume prior to the beginning of the second phase of injection. The second phase creates stratification leading to autoignition so that the overall effect of the two phases is to provide more complete combustion than if cylinder 12 were being fueled solely by conventional diesel (CD) combustion.

The total quantity of fuel injected during first and second phases 24, 26 is determined by factors that include at least engine speed and engine load. Those factors control the commencement and the duration of first phase 24 with the objective of injecting as large a proportion of the fuel during first phase 24 in order to promote mixing while at the same time assuring that autoignition will not occur until some time during second phase 26. Hence, fuel injection will transition from first phase 24 to second phase 26 in advance of autoignition by a finite amount of time which can vary depending on how engine 10 is being operated.

The control algorithm executed by engine controller 22 controls at least one characteristic of second phase 26. Those characteristics include the injection pressure at which fuel is injected during second phase 26 and the duration of the second phase so that the appropriate quantity of fuel is added to the quantity in the partially premixed charge created during first phase 24 to provide the appropriate total fuel quantity that is needed to deliver desired engine power The foregoing has disclosed a method for fueling engine cylinder 12 by operating fuel injector 20 to inject fuel into cylinder 12 for substantially the entire duration of first phase 24 at substantially maximum injection pressure that the fuel injector can deliver to create a premixed fraction of an air-fuel charge that does not combust. The method transitions fuel injection from first phase 24 to second phase 26 in advance of autoignition, and it is during the latter phase that fuel injector 20 is operated to inject fuel into cylinder 12 at pressure which is significantly less than the first phase injection pressure.

The foregoing has also disclosed a compression ignition engine 10 comprising an engine cylinder 12, a fuel injector 20 for injecting fuel into engine cylinder 12, an engine controller 22 for controlling injection of fuel into engine cylinder 12 by fuel injector 20, and an algorithm contained in engine controller 22 that is effective to cause fuel injector 20 to inject fuel into engine cylinder 12 for substantially the entire duration of the first phase 24 of fuel injection at substantially the maximum injection pressure that fuel injector 20 can deliver to create a premixed fraction of an air-fuel charge that does not combust. The algorithm transitions fuel injection from first phase 24 of fuel injection to a second phase 26 of fuel injection in advance of autoignition and it is during second phase 26 that fuel injector 20 is operated to inject fuel into engine cylinder 12 at pressure which is significantly less than the first phase injection pressure.

The reader may notice that top dead center (TDC) is not marked in FIG. 2. That is because autoignition can be controlled to occur before TDC and at other times after TDC. What the control algorithm does is to control the crank angle at which first phase 24 commences and to control the crank angle at which the injection transitions from first phase 24 to second phase 26 for causing autoignition to occur at a controlled crank angle during second phase 26. The control algorithm also causes the appropriate quantity of fuel to be injected during each of the first and second phases 24, 26 to provide desired engine power. The beginning of first phase 24 is controlled to occur within a window beginning substantially at 30° before TDC and ending substantially at 10° after TDC. The start of the second phase 26 is a leading combustion timing control parameter with SOC occurring at a particular point during the second phase.

The specific crank angle at which first phase 24 ends and second phase 26 begins, and the specific crank angle at which second phase 26 ends are determined by control algorithms in engine controller 22 that process various data relevant to engine fueling, such as engine speed and engine load. Hence, those specific crank angles for the two phases can vary depending on how engine 10 is being operated. While ROI during first phase 24 is set by the maximum injection pressure capability of fuel injector 20, ROI during second phase 26 may be a variable that is a function of how engine 10 is being operated. While the feed-back use of data representing the point at which autoignition occurred has been discussed above, non-feedback control of first phase 24 is possible by using one or more look-up tables.

What is claimed is:

1. A method of operating a compression ignition engine by fueling an engine cylinder to create an in-cylinder air-fuel charge and to cause that charge to autoignite, the method comprising:

operating a fuel injector to inject fuel into the engine cylinder for the entire duration of a first phase of fuel injection at a maximum injection pressure that the fuel injector can deliver to create a premixed fraction of the in-cylinder air-fuel charge prior to autoignition, with the duration of the first phase of fuel injection being based at least in part on a speed and a load of the engine;

operating the fuel injector to inject a second phase of the same fuel into the engine cylinder at an injection pressure less than the maximum injection pressure that the fuel injector can deliver, with the second phase of fuel being injected in advance of autoignition of the first phase of fuel and the injection pressure of the second phase of fuel injection being based at least in part on the speed and load of the engine.

2. The method set forth in claim 1 in which using a sensor to provide data representing a crank angle at which autoignition is expected to occur comprises processing data representing the crank angle at which autoignition occurred during an immediately preceding engine cycle.

3. The method set forth in claim 1 in which the second phase of fuel injection comprises operating the fuel injector to inject fuel into the engine cylinder at an injection pressure less than the maximum injection pressure that the fuel injector can deliver for the entire duration of the second phase of fuel injection.

4. The method set forth in claim 1 comprising controlling at least one variable characteristic of at least one of the first and second phases of fuel injection as a function of engine speed and engine load.

5. The method set forth in claim 4 in which controlling at least one variable characteristic of at least one of the first and second phases of fuel injection as a function of engine speed and engine load comprises controlling a crank angle at which the first phase of fuel injection commences to within a window that extends from 30° before TDC to 10° deg after TDC.

6. The method set forth in claim 5 in which the fuel injector is operated to inject fuel into the engine cylinder for the entire duration of the first phase of fuel injection at an injection pressure of at least of 3,000 bar.

* * * * *